(12) United States Patent
Mihara

(10) Patent No.: US 10,348,673 B2
(45) Date of Patent: Jul. 9, 2019

(54) MANAGEMENT SERVER SYSTEM, SYSTEM, METHOD OF SYSTEM, AND STORAGE MEDIUM

(71) Applicant: CANON KABUSHIKI KAISHA, Tokyo (JP)

(72) Inventor: Makoto Mihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 15/421,893

(22) Filed: Feb. 1, 2017

(65) Prior Publication Data

US 2017/0230327 A1 Aug. 10, 2017

(30) Foreign Application Priority Data

Feb. 4, 2016 (JP) .................................. 2016-020050

(51) Int. Cl.
*G06F 15/173* (2006.01)
*H04L 29/12* (2006.01)
*H04L 29/08* (2006.01)
*H04L 29/06* (2006.01)

(52) U.S. Cl.
CPC ...... *H04L 61/1511* (2013.01); *H04L 61/2007* (2013.01); *H04L 67/02* (2013.01); *H04L 67/10* (2013.01); *H04L 67/2809* (2013.01); *H04L 67/42* (2013.01)

(58) Field of Classification Search
CPC ..... H04L 67/42; H04L 67/10; H04L 67/2809; H04L 61/1511; H04L 61/2007; H04L 67/02
USPC ........................................................ 709/223
See application file for complete search history.

(56) References Cited

U.S. PATENT DOCUMENTS

| 2010/0257258 | A1* | 10/2010 | Liu ................... H04L 29/12066 709/220 |
| 2015/0058486 | A1* | 2/2015 | Huang .................... H04L 47/70 709/226 |
| 2016/0164829 | A1* | 6/2016 | Shigeeda .............. H04L 61/103 709/245 |
| 2016/0170792 | A1* | 6/2016 | Kato .................... G06F 9/45558 718/1 |

FOREIGN PATENT DOCUMENTS

| JP | 2004-295605 A | 10/2004 |
| JP | 4083049 A | 4/2008 |

* cited by examiner

*Primary Examiner* — Frantz B Jean
(74) *Attorney, Agent, or Firm* — Canon U.S.A., Inc. IP Division

(57) ABSTRACT

API hostnames and HTML hostnames are separately defined, and DNS switching for HTML is performed after a time lag from completion of DNS switching for APIs. APIs of old version are thereby prevented from being called from HTML screens of new version.

20 Claims, 10 Drawing Sheets

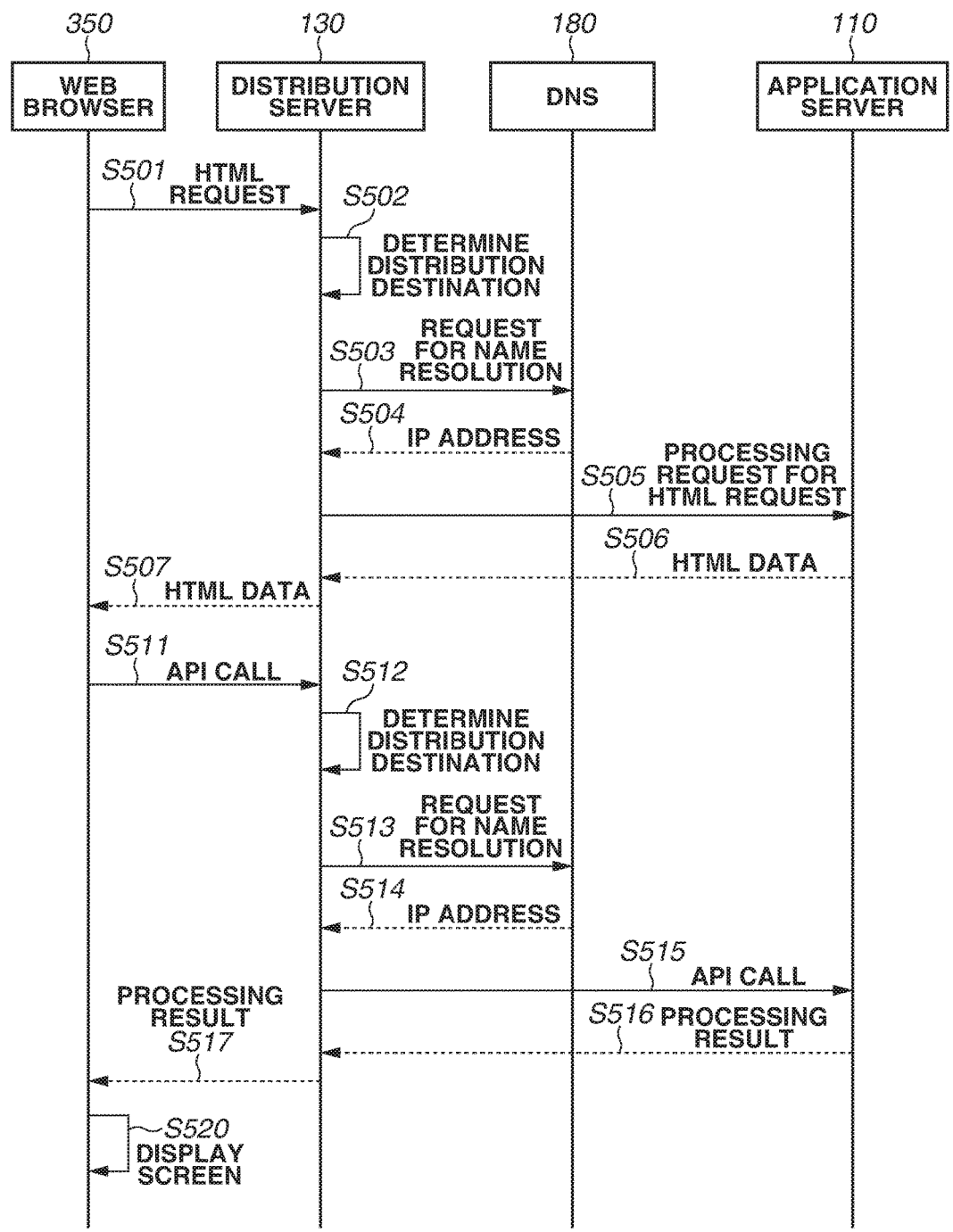

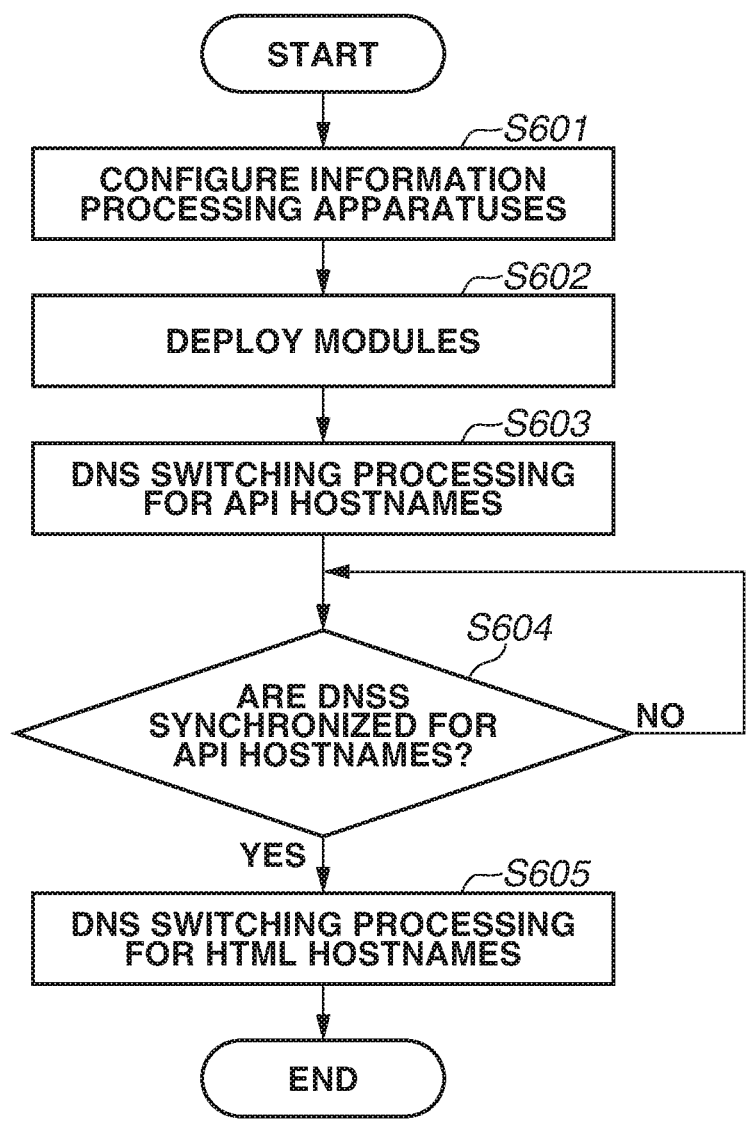

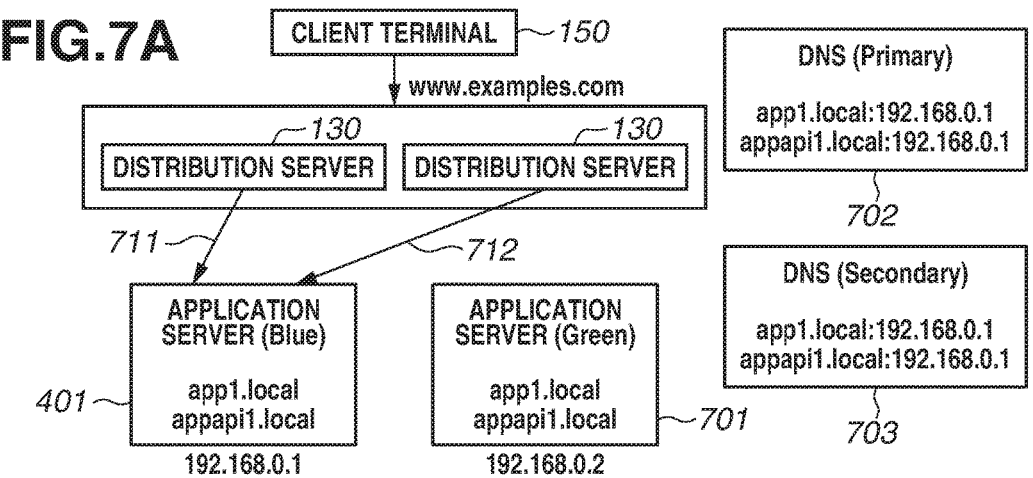
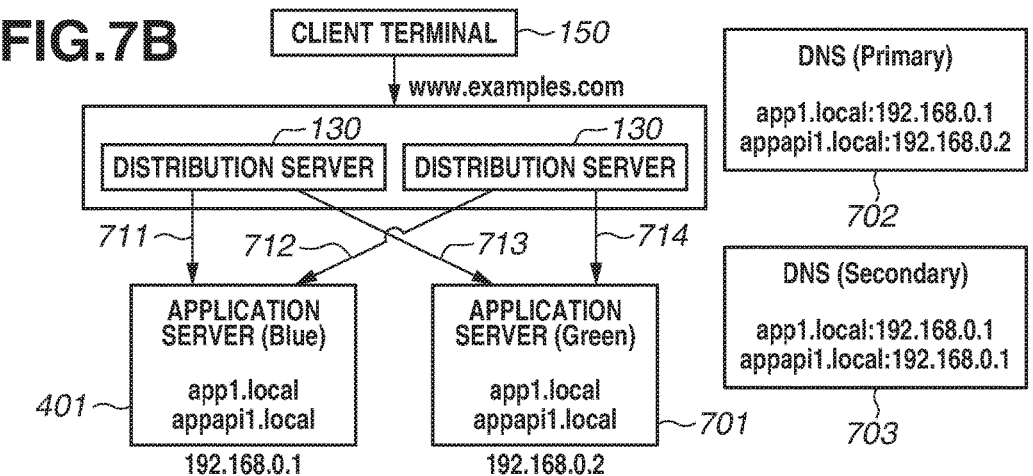
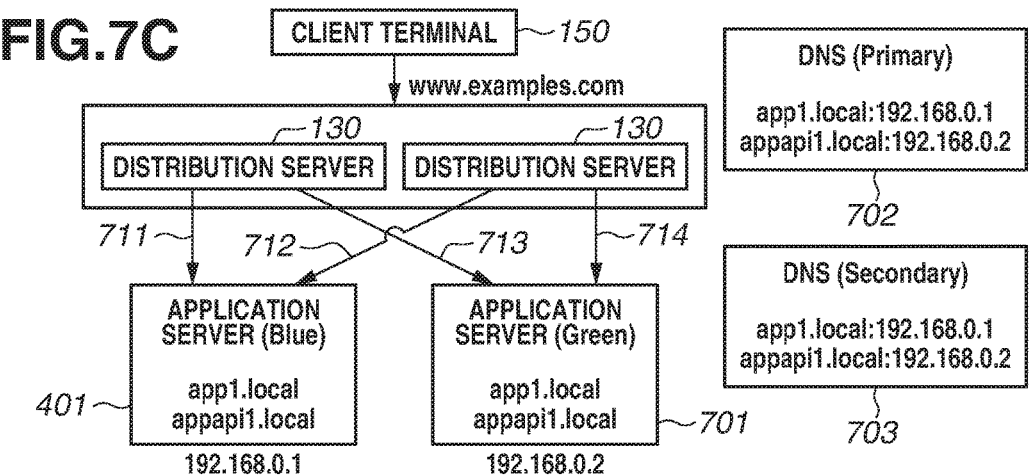

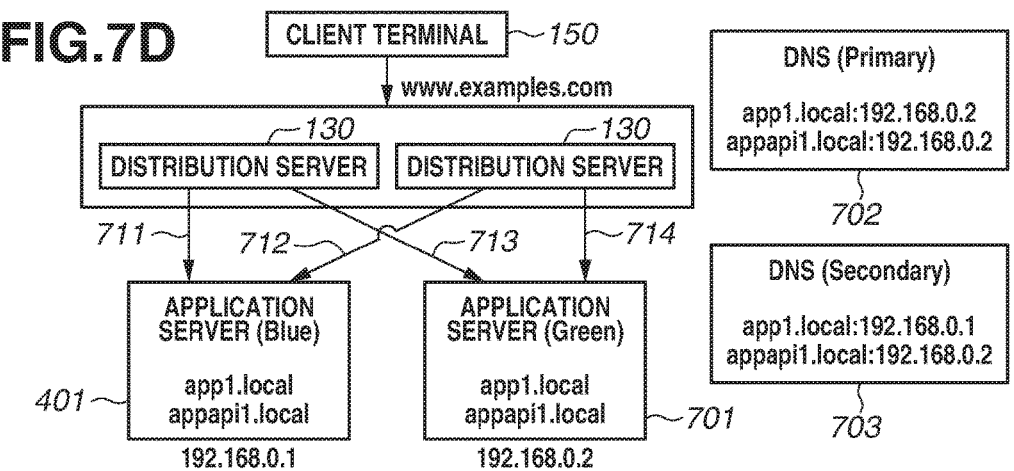
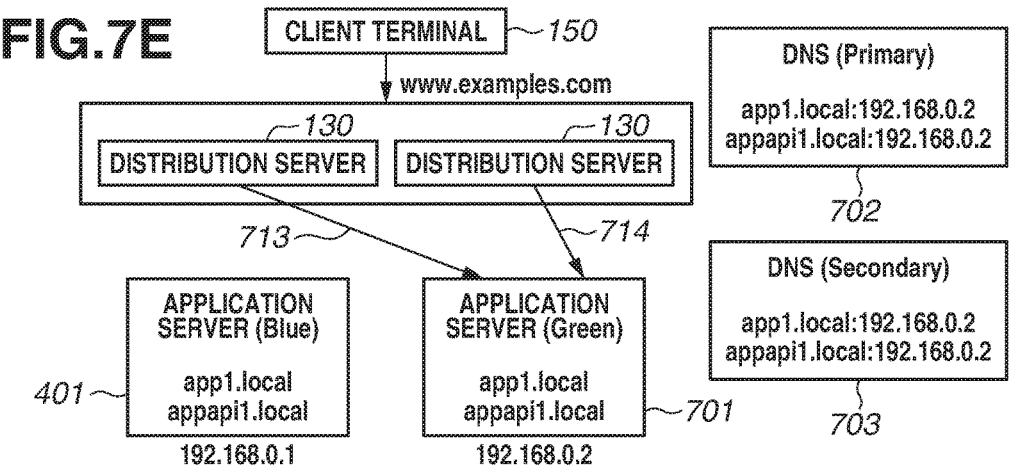

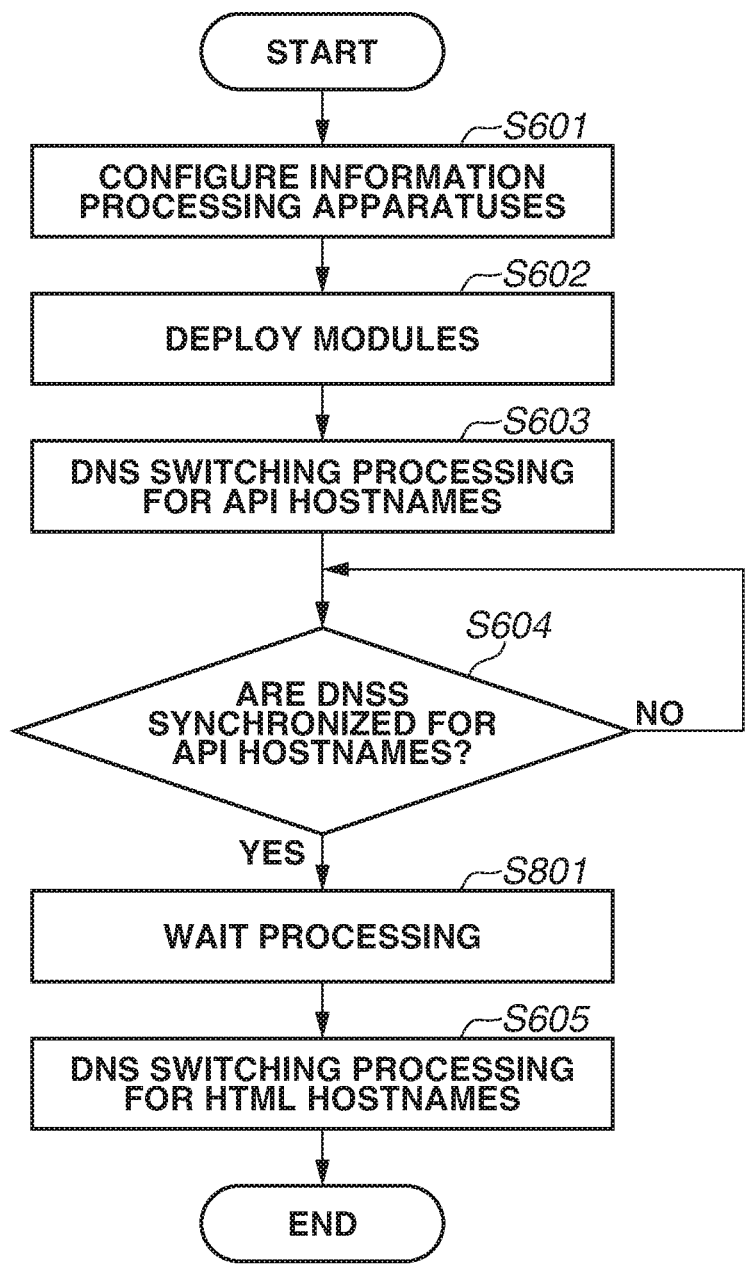

MANAGEMENT SERVER SYSTEM, SYSTEM, METHOD OF SYSTEM, AND STORAGE MEDIUM

BACKGROUND OF THE INVENTION

Field of the Invention

The aspect of the embodiments relates to a management server system, a system, a method of a system, and a storage medium for managing a server including a web application service.

Description of the Related Art

Services provided by servers on the Internet have been becoming prevalent in recent years. Those services may be operated in a mode in which the services are used by users from all over the world. In such a mode of operation, it is difficult to stop a system for service maintenance during a specific period of time. Thus, there is a growing demand for a technique of doing maintenance work without stopping a service. Japanese Patent No. 4083049 and Japanese Patent Application Laid-Open No. 2004-295605 discuss conventional techniques for performing server maintenance or server switching without stopping a service, by controlling distribution of requests from clients to servers.

As web application technology advances, a conventional configuration in which a server generates and transmits a screen of Hypertext Markup Language (HTML) format to a client is shifting to techniques such as representational state transfer (REST)-ful model-view-controller (MVC) and client-side MVC. According to such techniques, a server executes processing via a REST interface (I/F) and returns only data to a client. A screen is generated on the client side.

SUMMARY OF THE INVENTION

According to an aspect of the embodiments, a management server system for communicating with one or more domain name system (DNS) servers, which return an Internet Protocol (IP) address corresponding to a hostname received with a request for name resolution, and a distribution server, which transmits a processing request for an HTML request and an application programming interface (API) request from a client to a system corresponding to the IP address returned from the DNS server(s), includes a construction unit configured to deploy a program for constructing a system environment in an information processing apparatus to construct a system, and a setting unit configured to set an IP address of the system for each of a hostname corresponding to an HTML request and a hostname corresponding to an API request, the hostnames being registered in the DNS server(s), wherein, after a new system is constructed by the construction unit, the setting unit starts to rewrite the current IP address set for the hostname corresponding to the API request to an IP address of the new system, and, in response to confirmation that rewriting of all of the DNS server(s) corresponding to the request for name resolution from the distribution server is completed, starts to rewrite the IP address set for the hostname corresponding to the HTML request to the IP address of the new system.

Further features of the aspect of the disclosure will become apparent from the following description of exemplary embodiments with reference to the attached drawings.

BRIEF DESCRIPTION OF THE DRAWINGS

FIG. 5 is a sequence diagram illustrating a flow of processing performed by a client server when executing an application.

FIG. 6 is a flowchart illustrating upgrade processing.

FIGS. 7A, 7B, 7C, 7D, and 7E are diagrams each illustrating system configurations during the upgrade processing.

FIG. 8 is a flowchart illustrating upgrade processing.

DESCRIPTION OF THE EMBODIMENTS

As one technique for switching systems without stopping a service there is a method called blue-green deployment. The blue-green deployment is a technique for constructing a new system while maintaining the currently-running system in operation, and then switching the connections of clients to the new system. The system switching using the blue-green deployment can switch the systems by changing IP address settings of hostnames registered in a DNS.

However, there occurs a program. If there is a plurality of DNS servers used for name resolution, a requestor of the name resolution may be able to obtain both the IP address of the old system and that of the new system because there is a time difference in the synchronization of the IP address settings between the DNS servers. Even if the IP address of the hostname registered in the DNS is switched, not all access is immediately made to the new system. Which of the systems, new or old, is accessed is therefore not clear.

The aspect of the embodiments is directed to providing a system that prevents the occurrence of an API call to the old system via an HTML screen provided by the new system.

According to the aspect of the embodiments, an API call to the old system via an HTML screen provided by the new system can be prevented.

A mode for carrying out the aspect of the embodiments will be described below with reference to the drawings.

In a first exemplary embodiment, applications are deployed in servers on the Internet. The applications provide various functions in cooperation with client terminals. The applications providing such functions will be referred to as services. The provision of a function to a client terminal will be referred as the provision of a service.

Figure 1:
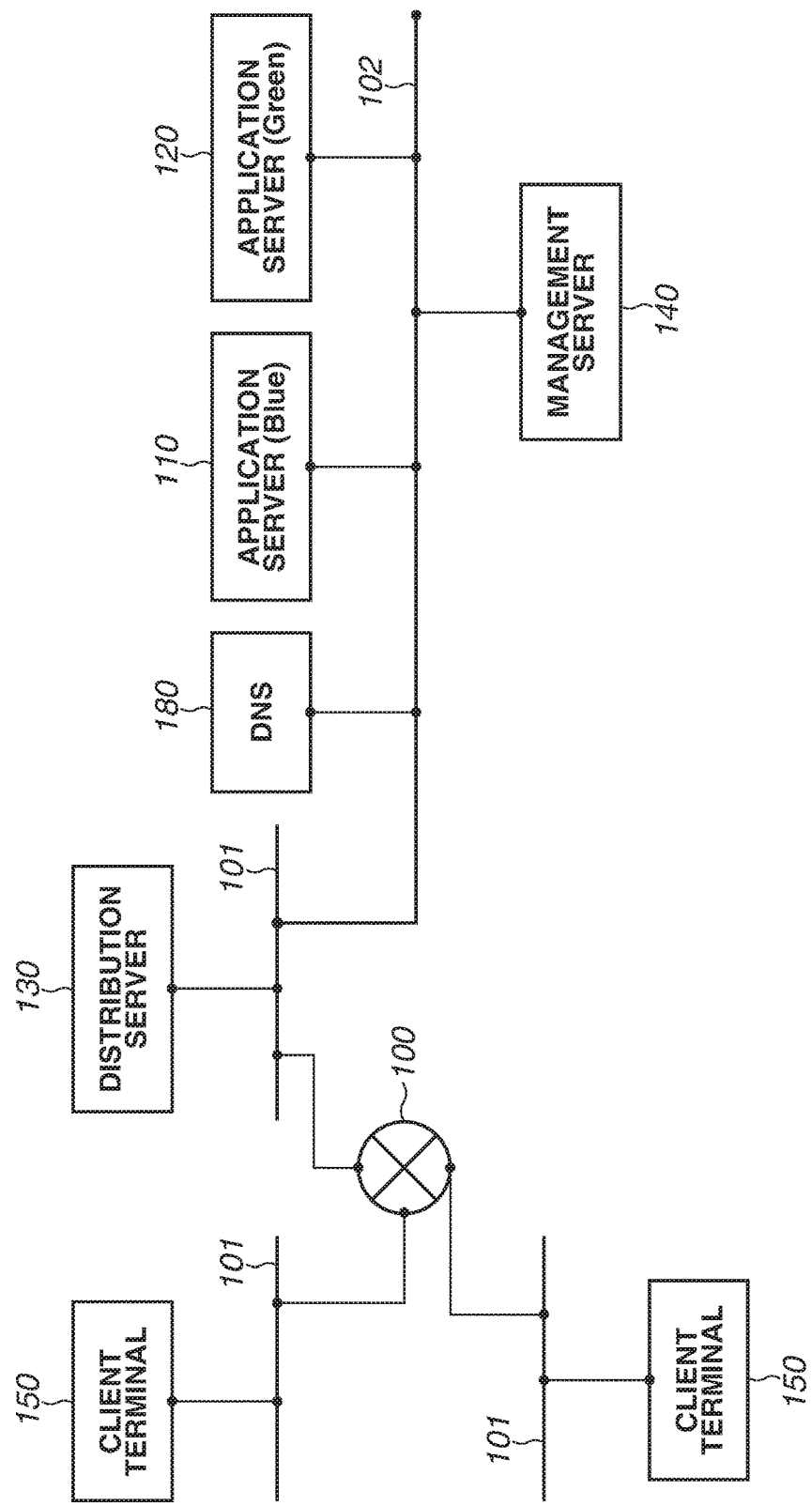
FIG. 1 is a block diagram illustrating a system configuration.

FIG. 1 illustrates a system configuration according to the present exemplary embodiment. An upgrade system according to the exemplary embodiment includes a management server 140, a DNS 180, and a distribution server 130. Application servers 110 and 120 provide services. In FIG. 1, the servers are illustrated to include one information processing apparatus each. It should be noted, however, that the number of information processing apparatuses constituting each server is not limited in particular. Client terminals 150 use the services.

In the present exemplary embodiment, a wide area network (WAN) 100 is constructed as a World Wide Web (WWW) system. Local area networks (LANs) 101 connect the components. A LAN 102 is similar to the LANs 101, but is often configured as an internal network not accessible via the WAN 100. Like the LANs 101, the LAN 102 may be configured to be directly connected to and accessible from the WAN 100.

The application servers 110 and 120 each include one or a plurality of information processing apparatuses. The application servers 110 and 120 are implemented on a network having a configuration as illustrated in FIG. 1. The application server 110 is one that is currently providing services. The application server 120 is the next system to provide the services. System switching between the application servers 110 and 120 does not necessarily be performed only for the purpose of upgrading.

The distribution server 130 typically includes a plurality of information processing apparatuses, but may be constituted by a single information processing apparatus. The distribution server 130 has a function of distributing access from the client terminals 150 to appropriate ones of the application servers 110 and 120. The management server 140 typically includes a plurality of information processing apparatuses, but may be constituted by a single information processing apparatus. The management server 140 manages programs constituting the application servers 110 and 120, and performs construction and switching processing of the application servers 110 and 120.

The client terminals 150 are information processing apparatuses on which a web browser is installed. Examples of the client terminals 150 include a personal computer and a mobile terminal such as a smartphone. The DNS 180 is a system that resolves hostnames of the servers on the network and returns IP addresses of access destinations. An information processing apparatus or apparatuses of the DNS 180 may be referred to simply as a DNS, and may be referred to as a DNS server. In either case, the DNS 180 is a system having the function of returning an IP address to a requestor in response to a name resolution request. With the blue-green deployment, service switching is achieved by rewriting an IP address corresponding to a hostname registered in the DNS 180 from that of the application server 110 to that of the application server 120. The distribution server 130 transmits requests from the client terminals 150 to an application server. More specifically, the distribution server 130 transmits data corresponding to the requests from the client terminal 150 to either one of the application servers 110 and 120 that is name-resolved by the DNS 180. This means that the distribution server 130 obtains the IP address of the application server corresponding to a set transfer destination hostname from the DNS 180, and is connected to either one of the application servers 110 and 120 in operation.

The above is the description of the apparatuses included in the present upgrade system. As describe above, the servers may be configured to include one or a plurality of information processing apparatuses each. As employed herein, the servers may therefore be referred to as server systems, so that both the configurations are covered. For example, if the management server 140 is referred to as a management server system, the management server 140 is intended to include either a single information processing apparatus or a server group including a plurality of information processing apparatus.

Figure 2:
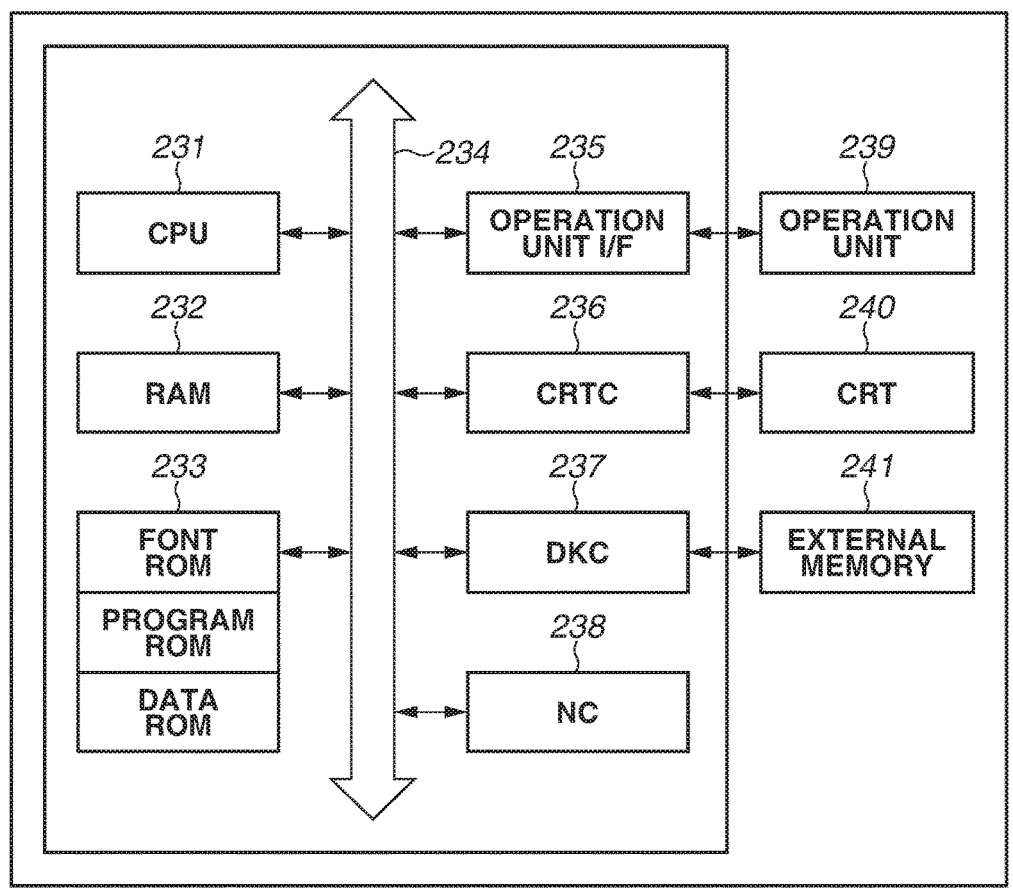
FIG. 2 is a block diagram illustrating a hardware configuration of each apparatus.

FIG. 2 illustrates a typical hardware configuration of the information processing apparatuses including the application servers 110 and 120, the distribution server 130, the management server 140, the client terminals 150, and the DNS 180. A central processing unit (CPU) 231 executes programs that are stored in a program read-only memory (ROM) of a ROM 233 or loaded from an external memory 241, such as a hard disk (HD), into a random access memory (RAM) 232. Examples of the programs include an operating system (OS) running on a computer, and applications. The CPU 231 also controls blocks connected to a system bus 234. Processing of sequences to be described below is implemented by executing the OS. The RAM 232 functions as a main memory and a work area of the CPU 231. An operation unit I/F 235 controls input from an operation unit 239. A cathode-ray tube (CRT) controller (CRTC) 236 controls display of a CRT display 240. A disk controller (DKC) 237 controls data access to the external memory 241, such as an HD, which stores various types of data. A network controller (NC) 238 performs communication control processing with server computers and other devices connected via the WAN 100 and/or the LAN(s) 101 and/or 102.

Throughout the following description, hardware agents that execute software are the CPUs 231, and software agents are application programs installed on the external memories 241, unless otherwise specified. The application programs are installed and deployed in the information processing apparatuses, and the CPUs 231 execute the deployed application programs to implement a system environment having a software configuration illustrated in FIG. 3.

Figure 3:
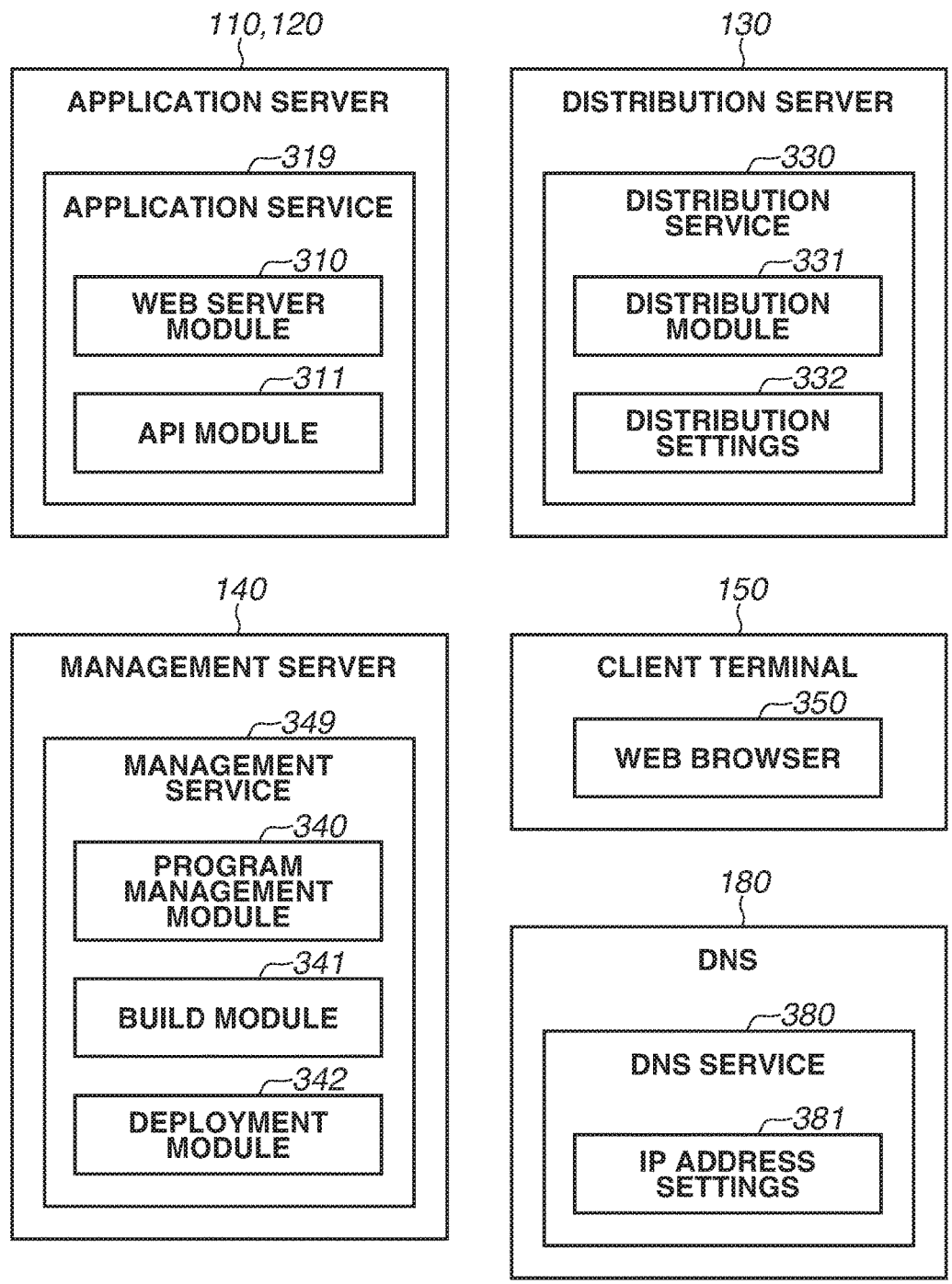
FIG. 3 is a block diagram illustrating a software module configuration of each apparatus.

FIG. 3 is a diagram illustrating the respective software configurations of the application servers 110 and 120, the distribution server 130, the management server 140, the client terminals 150, and the DNS 180.

The application servers 110 and 120 include an application service 319. The application service 319 includes a web server module 310 and an API module 311. The web server module 310 typically uses Jetty or Apache Tomcat to distribute HTML data and JavaScript (registered trademark) and/or provide an execution environment for the API module 311. The application servers 110 and 120 execute the web server module 310 to implement HTTP-related processing. Examples include the generation of a display screen in an HTML format and the provision of the generated display screen to the client terminals 150. The application servers 110 and 120 further execute the API module 311 to implement API processing. Both the web server module 310 and the API module 311 perform various types of processing in response to reception of a processing request for a request from a client.

The distribution server 130 includes a distribution service 330. The distribution service 330 includes a distribution module 331 and distribution settings 332. The distribution module 331 determines access from the client terminals 150 to the application server 110 or 120 according to the distribution settings 332, based on Universal Resource Locators (URLs) that the client terminals 150 use in accessing the distribution server 130. Details of the distribution settings 332 will be described below.

The management server 140 includes a management service 349. The management service 349 includes a program management module 340, a build module 341, and a deployment module 342. The program management module 340 manages programs for constructing the system environment of the application servers 110 and 120. The build module 341 builds the programs managed by the program management module 340 into executable modules. The deployment module 342 deploys the executable modules generated by the build module 341 to the information processing apparatuses and constructs the system configuration of the application servers 110 and 120 to perform upgrade processing of the application service 319.

The DNS 180 includes a DNS service 380. The DNS service 380 responds to a request for name resolution with an IP address based on IP address settings 381. Details of the IP address settings 381 will be described below. The client terminals 150 include a web browser 350 for accessing the application servers 110 and 120.

Figure 4:
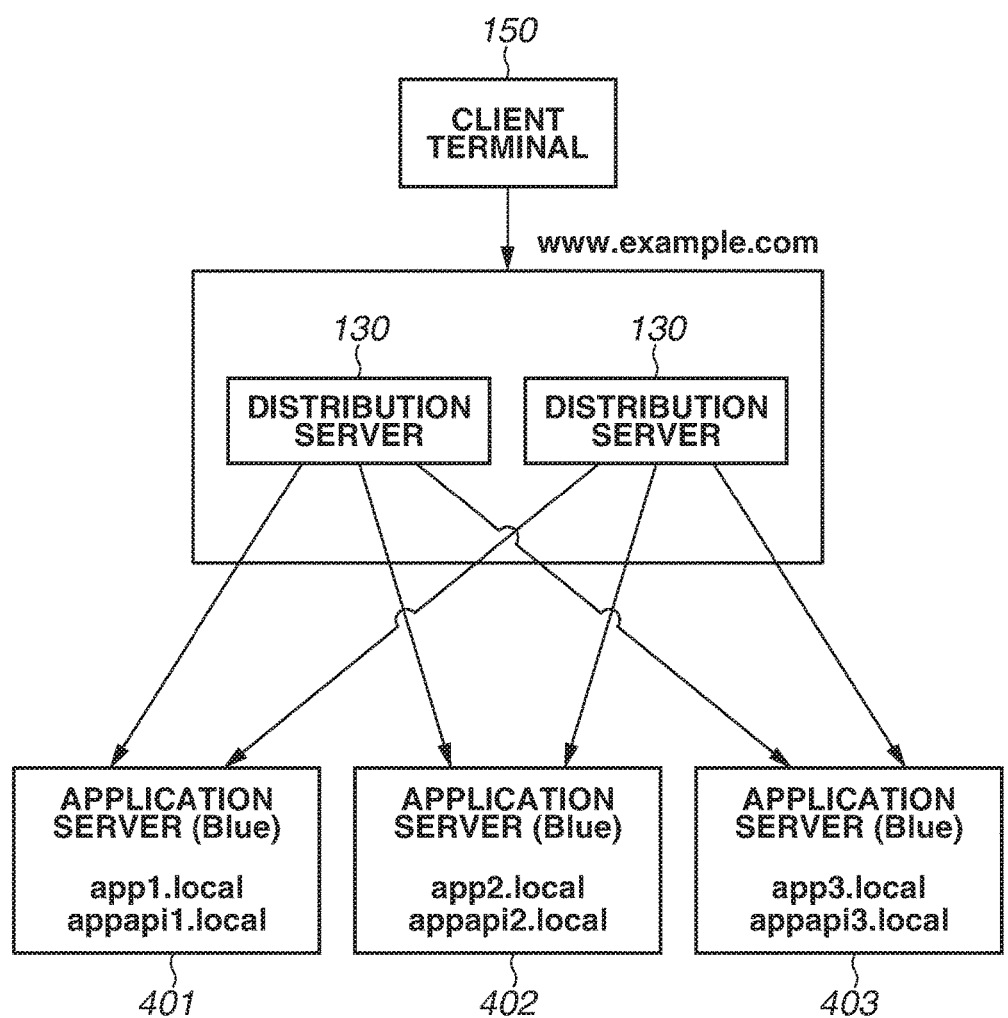
FIG. 4 is a schematic diagram illustrating communications from a client terminal to application servers.

FIG. 4 is a diagram schematically illustrating communication paths for a client terminal 150 to access the application server 110 according to the present exemplary embodiment. As an exemplary embodiment, the application server 110 includes application servers 401, 402, and 403 that provide respective different services. In FIG. 4, behavior of the distribution server (distribution server system) 130 will be described.

Two types of hostnames "app1.local" and "appapi1.local" are assigned to the application server 401. Similarly, the application server 402 has hostnames "app2.local" and "appapi2.local". The application server 403 has hostnames "app3.local" and "appapi3.local". The reason why two types of hostnames are assigned is to separate HTML requests from AP requests. Details of such processing will be described below. The distribution server 130 has a hostname "www.example.com".

The user inputs the hostname assigned to the distribution server 130 and an access path into the web browser 350 of a client terminal 150. An example of the URL is "https://www.example.com/app1/login". The web browser 350 of the client terminal 150 issues a request to the distribution server 130.

The distribution server 130 receiving the request refers to the distribution settings 332 and determines the server to distribute the request to (distribution destination). A specific example of the distribution settings 332 will be described with reference to Table 1. In the following settings, access to paths starting with "/app1" is set to be transferred to an "https://app1.local" server, and is thus transferred to the application server 401. Access to paths starting with "appapi1" is set to be transferred to an "https://appapi1.local" server, and is thus also transferred to the application server 401.

TABLE 1

| Distribution Settings 332 | |
| --- | --- |
| Path | Transfer destination URL |
| /app1* | https://app1.local |
| /appapi1* | https://appapi1.local |
| /app2* | https://app2.local |
| /appapi2* | https://appapi2.local |
| /app3* | https://app3.local |
| /appapi3* | https://appapi3.local |

FIG. 5 is a sequence diagram illustrating a flow of processing in which the web browser 350 of a client terminal 150 according to the present exemplary embodiment obtains a screen from the application server 110 and executes an application.

In step S501, the web browser 350 of the client terminal 150 issues an HTML request. In step S502, the distribution server 130 receiving the HTML request determines the application server 110 to be the distribution destination based on the requested URL and the distribution settings 332. If the client terminal 150 accesses the distribution server 130 with a URL including a path starting with "/app1", the application server 110 of "https://app1.local" is determined to be the distribution destination. In step S503, to issue a request to "https://app1.local", the distribution server 130 transmits a request for name resolution to the DNS 180. The DNS 180 manages hostnames and IP addresses as illustrated in Table 2. In step S504, the DNS 180 returns an IP address based on such setting information. If the hostname is "app1.local", the DNS 180 returns "192.168.0.1". The method for specifying a hostname is not limited to that of the present exemplary embodiment. Part of the hostname included in the URL may be transmitted to the DNS 180. A hostname does not necessarily include a domain name.

TABLE 2

| IP Address Settings 381 | |
| --- | --- |
| Hostname | IP address |
| app1.local | 192.168.0.1 |
| appapi1.local | 192.168.0.1 |
| app2.local | 192.168.1.1 |
| appapi2.local | 192.168.1.1 |
| app3.local | 192.168.2.1 |
| appapi3.local | 192.168.2.1 |

In step S505, the distribution server 130 obtaining the IP address issues a processing request for the HTML request to the server having the IP address. In step S506, the distribution server 130 obtains HTML data. In step S507, the distribution server 130 returns the obtained HTML data to the web browser 350. In displaying the returned HTML data, in step S511, the web browser 350 calls an API by JavaScript (registered trademark) written in the HTML data. The web browser 350 makes the API call to a URL different from that of the screen, such as "https://www.example.com/appapi1/v1/function1". In step S512, the distribution server 130 receiving the API call that is an API request determines the distribution destination to be the application server 110 of "http://appapi1.local" as with the HTML request. In step S513, to transmit a processing request for the API request to "https://appapi1.local", the distribution server 130 makes a request for name resolution to the DNS 180. In the example of Table 2, "app1.local" and "appapi1.local" correspond to the same IP address. In step S514, the DNS 180 thus returns the same value as in step S504. Note that the setting values can be changed to make the server to be accessed for the HTML request different from that for the API call. In a series of processes of steps S515 to S517, the distribution server 130 returns a processing result of the API to the web browser 350. In step S520, the web browser 350 displays a screen based on the processing result of the API of step S517.

Next, a method by which the deployment module 342 of the management server 140 switches from the application server 110 to the application server 120 in the upgrade system of the present exemplary embodiment will be described with reference to FIGS. 6, 7A, 7B, 7C, 7D, and 7E. FIGS. 6, 7A, 7B, 7C, 7D, and 7E illustrate a method for upgrading the application service 319 of the application server 110 to a new version of the application service 319 deployed in the application server 120. FIG. 6 illustrates a flow of the upgrade processing performed by the deployment module 342. FIGS. 7A, 7B, 7C, 7D, and 7E each illustrate the system configurations during the upgrade processing.

When the upgrade processing is started by the management server 140, the deployment module 342 performs the series of processes illustrated in FIG. 6. In step S601, to construct an application server 701 illustrated in FIGS. 7A, 7B, 7C, 7D, and 7E, the deployment module 342 initially configures an information processing apparatus or apparatuses. The blue-green deployment is usually implemented by configuring virtual information processing apparatuses. Virtual information processing apparatuses are a technique for generating a plurality of virtual information processing apparatuses on the hardware of an information processing apparatus. The generation and deletion of the virtual information processing apparatuses can be controlled by a program. For example, as many virtual information apparatuses as needed for deployment can be generated and modules for constituting the application service 319 can be deployed on the virtual information processing apparatuses to construct the application server 701. Virtual information processing apparatuses that are no longer needed can be immediately deleted. This enables quick and easy implementation of the blue-green deployment. The aspect of the embodiments is not limited to virtual information processing apparatuses, and the application server 701 may be constituted by a physical information processing apparatus or apparatuses. In such a case, the processing of step S601 is not performed, but the information processing apparatus(es) intended for the application server 701 is/are to be constructed in advance. Transition processing is then performed on such an information processing apparatus(es).

In step S602, the deployment module 342 performs module deployment. The deployment module 342 deploys a web server module 310 and an API module 311 on the information processing apparatuses generated in step S601. If upgrade is intended, a new HTML screen or screens is/are added to the web server module 310. A new API or APIs is/are added to the API module 311. The new HTML screen(s) can call the new API(s). The construction of the application server 701 illustrated in FIG. 7A is thus completed. At this stage, the upgraded application server 701 is simply added to the upgrade system. The distribution server 130 does not transmit any processing request to the application server 701.

In the present exemplary embodiment, the DNS 180 includes two DNSs, a primary DNS 702 and a secondary DNS 703. The DNS 180 typically includes a plurality of DNSs, not a single DNS, for reasons such as availability and performance. The primary DNS 702 is a main DNS. The secondary DNS 703 is a sub DNS which is synchronized to the settings of the primary DNS 702. For name resolution, the distribution server 130 may use either of the primary and secondary DNSs 702 and 703 to resolve names. At this stage, the IP address settings 381 of the primary DNS 702 include "192.168.0.1", the IP address of the application server 401, both as an HTML host setting and an API host setting. Since the synchronization between the primary DNS 702 and the secondary DNS 703 is completed, the IP address settings 381 of the secondary DNS 702 also include "192.168.0.1" for both. At this stage, like before the upgrading, the distribution server 130 transmits processing requests for requests to the application server 401 through paths 711 and 712.

In step S603, the deployment module 342 performs DNS switching processing for API hostnames. More specifically, the deployment module 342 rewrites the current IP address set for the hostname "appapi1.local" corresponding to API requests in the primary DNS 702 to the value of the IP address of the application server 701, "192.168.0.2". FIG. 7B is a block diagram illustrating a state in which the processing up to step S603 is completed. In obtaining HTML data, the distribution server 130 transmits a processing request for the request to the application server 401 through the path 711 or 712. In calling an API, if the primary DNS 702 is used to perform name resolution in step S513, the distribution server 130 transmits a processing request for the request to the application server 701 through a path 713 or 714. If the secondary DNS 703 is used to perform name resolution in step S513, the distribution server 130 transmits the processing request for the request to the application server 401 through the path 711 or 712. At this stage, an API call is transmitted to either one of the application servers 401 and 701. Which API is called varies request by request.

Since the application server 701 includes the same APIs as those of the application server 401, API calls specified in the HTML data provided by the application server 401 can be processed without problem. The reason is that as far as the switching of the HTML hosts is concerned, the primary DNS 702 and the secondary DNS 703 both refer to the IP address of the blue application server 401. The display screen displayed on the client terminal 150 is one not supporting the new APIs. The APIs added to only the application server 701 are not used because the new HTML data added to the application server 701 is not provided to the client terminal 150.

In step S604, the deployment module 342 checks whether the primary and secondary DNSs 702 and 703 are synchronized for API hostnames. More specifically, the deployment module 342 performs the name resolution of "appapi1.local" with the primary DNS 702 and the secondary DNS 703, and determines whether the value "192.168.0.2" set in step S604 is obtained from both the primary and secondary DNSs 702 and 703. If either of the obtained values is "192.168.0.1" which is the IP address of the application server 401 (NO in step S604), step S604 is repeated. If the obtained values are "192.168.0.2" which is the IP address of the application server 701 (YES in step S604), the processing proceeds to step S605. If the DNS 180 includes three or more DNSs, the deployment module 342 checks the IP addresses in all of the DNSs except the one in which the IP address is rewritten. FIG. 7C is a block diagram in the stage after the processing of step S604 and before a start of the processing of step S605. The IP address settings 381 of the secondary DNS 703 are synchronized with the IP address settings 381 of the primary DNS 702. In obtaining HTML data, the distribution server 130 transfers requests to the application server 401 through the paths 711 and 712. In calling APIs, the distribution server 130 transmits all requests to the application server 701 through the paths 713 and 714.

In step S605, the deployment module 342 performs DNS switching processing for HTML hostnames. More specifically, the deployment module 342 rewrites the IP address for the hostname "app1.local" corresponding to HTML requests in the primary DNS 702 to the value of the IP address of the application server 701, "192.168.0.2". FIG. 7D is a block diagram illustrating a state in which the processing up to step S605 is completed. In obtaining HTML data, if the primary DNS 702 is used to perform name resolution in step S503, the distribution server 130 transfers the request to the application server 701 through the path 713 or 714. If the secondary DNS 703 is used to perform name resolution in step S503, the distribution server 130 transfers the request to the application server 401 through the path 711 or 712. At this stage, which of the application servers 401 and 701 a request is transmitted to in obtaining HTML data varies request by request. Since all API calls are transferred to the application server 701, API calls specified in the new HTML data obtained from the application server 701 can be processed without problem.

The processing of the deployment module 342 is thus completed. After a lapse of a certain time, the IP address settings 381 of the secondary DNS 703 are synchronized with those of the primary DNS 702, and the IP address for the HTML hostname is set to "192.168.0.2". FIG. 7E illustrates the final configuration. At this stage, the distribution server 130 transfers all requests to the application server 701 through the paths 713 and 714.

The upgrade processing of the application service 319 is thus completed. API hostnames and HTML hostnames are separately defined, and the DNS switching for the API hostnames is completed before the DNS switching for the HTML hostnames is performed with a time lag. This can prevent the APIs of the old system from being used from HTML screens of the new system. As an example of the effect, the following situation can be avoided. Suppose that a screen in HTML format provided by the upgraded new system is displayed on a client terminal 150. An API of the old system yet to be upgraded is called from the screen. In other words, the request for the acquisition of the screen is distributed to the new system by the DNS name resolution, and the request for the use of the API via the screen is distributed to the old system by the DNS name resolution. In such a case, the old system does not include new APIs for new functions provided by the new system, and the request from the client terminal 150 fails to be properly processed, and a desired result fails to be returned to the user.

In the first exemplary embodiment, the distribution server 130 is described to perform steps S503 and S515 for the name resolution processing of a hostname by the DNS 180 each time. In such a case, high load is incurred because a lot of requests for name resolution processing are transmitted to the DNS 180. There may be also a situation that performing name resolution each time reduces the throughput of the entire system accordingly. The distribution server 130 then may be set to store the IP addresses obtained in steps S504 and S514 for a certain period of time and, if accessed with the same hostnames, reuse the previously-obtained IP addresses without performing the processing of step S503 or S513.

In such a case, there is a period in which the distribution server 130 does not transmit a request for name resolution to the DNS 180 and performs name resolution by using the previously-obtained IP addresses although the DNS synchronization for API hostnames is completed in step S604. This can cause a situation in which the distribution server 130 does not immediately switch the IP address of the access destination to that of the new system, while the DNS 180 has been switched to the new system about display screens. As a result, one distribution server 130 can distribute requests for display screens to the new system according to the name resolution by the DNS 180 while another distribution server 130 distributes requests for APIs to the old system by using the cached IP address of the old system. The reason is that the group of servers constituting the distribution server 130 store IP addresses at respective different timings, and there is a time lag until the new setting values are reflected on all of the distribution servers 130. There is thus a situation that the use of the APIs of the old system from an HTML screen of the new system is unable to be prevented. The second exemplary embodiment is similar to the first exemplary embodiment unless otherwise described below.

FIG. 8 is a flowchart illustrating upgrade processing performed by the deployment module 342 according to the present exemplary embodiment. Steps S601 to S605 are similar to those of the processing described with reference to FIG. 6. In step S801, the deployment module 342 performs wait processing for a predetermined wait time. For example, if the cache time for the DNS name resolution of the distribution server 130 is set to 60 seconds, then in step S801, the deployment module 342 waits idly for 60 second or more. In the present exemplary embodiment, the wait processing is assumed to be performed for a certain time in addition to the cache time of 60 seconds. This ensures that the caches of the distribution servers 130 are updated. While the management server 140 is waiting, the caches for DNS name resolution in all of the distribution servers 130 expire. With the caches expired, the distribution servers 130 issue a request for name resolution in step S513, whereby the IP address of the application server 701 is obtained. The wait time may be set by the user in advance or by the management server 140 communicating with the distribution servers 130 to check the setting of the cache time. However, this is not restrictive. One feature of an exemplary embodiment of the disclosure is to wait until the caches in all of the distribution servers 130 of the upgrade system expire and the distribution servers 130 become ready to issue a request for name resolution to the DNS 180.

As described above, a predetermined wait time can be provided to prevent the APIs of the old system from being used from an HTML screen of the new system even if the distribution servers 130 include caches for name resolution.

Figure 9:
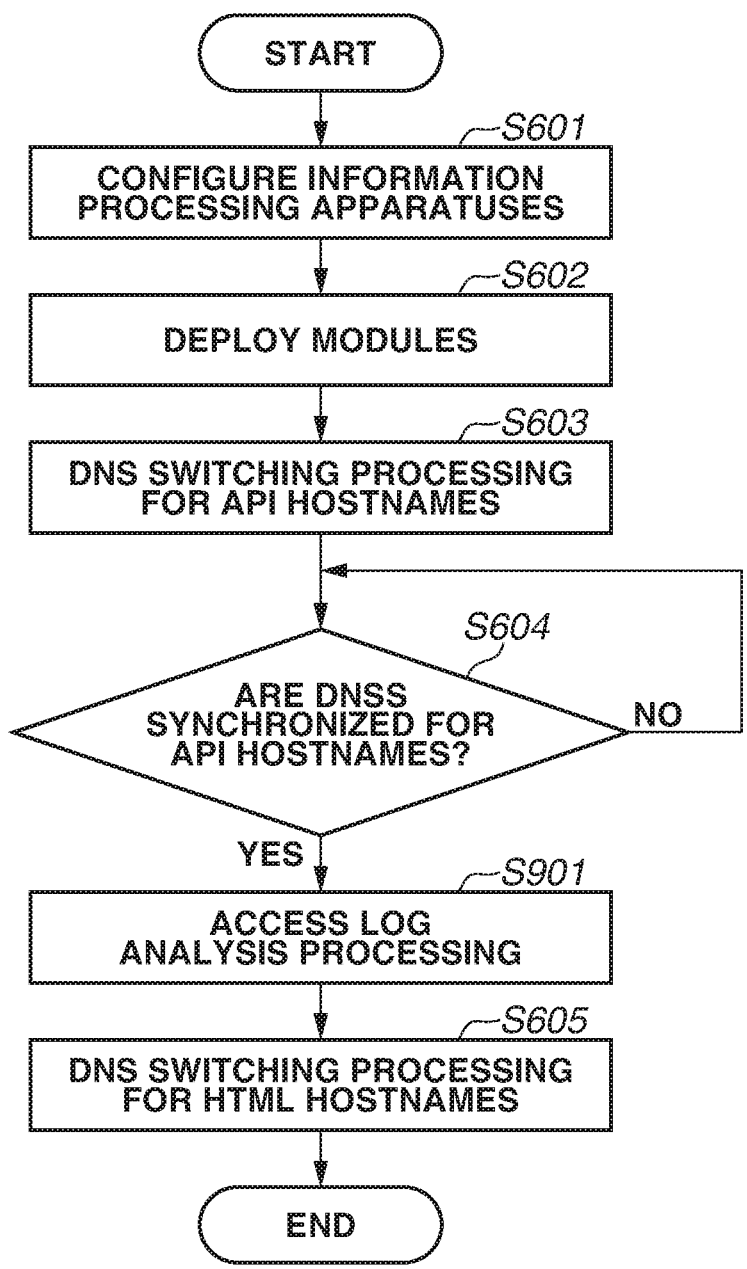
FIG. 9 is a flowchart illustrating upgrade processing.

The third exemplary embodiment is similar to the first exemplary embodiment unless otherwise described below. FIG. 9 is a flowchart illustrating upgrade processing performed by the deployment module 342 according to the present exemplary embodiment. Steps S601 to S605 are similar to those of the processing described with reference to FIG. 6. In step S901, the deployment module 342 performs access log analysis processing. The application server 401 typically outputs a log of all of HTML requests and API requests from the client terminals 150, about which URL path is accessed when. The deployment module 342 analyzes such a log and confirms, for example, that HTML screens starting with a path "/app1*" have been accessed but no API call stating with a path "/appapi1*" has been made for a certain period of time. If the log includes no such API call made by an API request for a certain period of time, the distribution servers 130 are confirmed to be transmitting processing requests for API requests to the application server 701.

As described above, the access log can be analyzed to prevent the APIs of the old system from being used from an HTML screen of the new system although the distribution servers 130 include caches for name resolution.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-020050, filed Feb. 4, 2016, which is hereby incorporated by reference herein in its entirety.

What is claimed is:

1. A management server system for communicating with one or more domain name system (DNS) servers and a distribution server, the DNS server(s) returning an internet protocol (IP) address corresponding to a hostname received with a request for name resolution, the distribution server transmitting a processing request for a Hypertext Markup Language (HTML) request and an application programming interface (API) request from a client to a system corresponding to the IP address returned from the DNS server(s), the management server system comprising:
at least one processor; and
a memory coupled to the at least one processor, the memory having instructions that, when executed by the processor, perform operations as:
a construction unit configured to deploy a program for constructing a system environment in an information processing apparatus to construct a system; and
a setting unit configured to set an IP address of the system for each of a hostname corresponding to an HTML request and a hostname corresponding to an API request, the hostnames being registered in the DNS server(s),
wherein, after a new system is constructed by the construction unit, the setting unit starts to rewrite the current IP address set for the hostname corresponding to the API request to an IP address of the new system, and, in response to confirmation that rewriting of all of the DNS server(s) corresponding to the request for name resolution from the distribution server is completed, starts to rewrite the IP address set for the hostname corresponding to the HTML request to the IP address of the new system.

2. The management server system according to claim 1, wherein the setting unit transmits the hostname corresponding to the API request to all of the DNS server(s) with the request for name resolution and determines whether all of the DNS server(s) returns/return the IP address of the new system to confirm completion of the rewriting.

3. The management server system according to claim 1, wherein the distribution server has a function of caching the IP address returned from the DNS server(s), and reads a cached IP address corresponding to a hostname and transmits a processing request to a system corresponding to the read IP address without transmitting a request for name resolution to the DNS server(s), and
wherein, after the rewriting of all of the DNS server(s) is confirmed to be completed, the setting unit further waits until processing for updating the IP address cached by the distribution server transmitting the request for name resolution to the DNS server(s) to the IP address of the new system is completed, and then starts to rewrite the IP address set for the hostname corresponding to the HTML request to the IP address of the new system.

4. The management server system according to claim 3, wherein the setting unit waits until the processing for updating the IP address cached by the distribution server transmitting the request for name resolution to the DNS server(s) to the IP address of the new system is completed, further waits for a predetermined time thereafter, and then starts to rewrite the IP address set for the hostname corresponding to the HTML request to the IP address of the new system.

5. The management server system according to claim 1, wherein, after the rewriting of all of the DNS server(s) is confirmed to be completed, the setting unit starts to rewrite the IP address set for the hostname corresponding to the HTML request to the IP address of the new system in response to confirmation that a log, which is output in response to reception of a processing request for an API request by the system corresponding to the IP address yet to be rewritten, has not been output for a predetermined period of time.

6. A system including a client, one or more domain name system (DNS)servers returning an interne protocol (IP) address corresponding to a hostname received with a request for name resolution, a distribution server transmitting a processing request for an Hypertext Markup Language (HTML) request and an application programing interface (API)request from the client to a system corresponding to the IP address returned from the DNS server(s), and a management server system, the system comprising:
at least one processor; and
a memory coupled to the at least one processor, the memory having instructions that, when executed by the processor, perform operations as:
a construction unit configured to deploy a program for constructing a system environment in an information processing apparatus to construct a system; and
a setting unit configured to set an IP address of the constructed system for each of a hostname corresponding to an HTML request and a hostname corresponding to an API request, the hostnames being registered in the DNS server(s),
wherein, after a new system is constructed by the construction unit, the setting unit starts to rewrite the current IP address set for the hostname corresponding to the API request to an IP address of the new system, and, in response to confirmation that rewriting of all of the DNS server(s) corresponding to the request for name resolution from the distribution server is completed, starts to rewrite the IP address set for the hostname corresponding to the HTML request to the IP address of the new system.

7. The system according to claim 6, wherein the setting unit transmits the hostname corresponding to the API request to all of the DNS server(s) with the request for name resolution and determines whether all of the DNS server(s) returns/return the IP address of the new system to confirm completion of the rewriting.

8. The system according to claim 6,
wherein the distribution server has a function of caching the IP address returned from the DNS server(s), and reads a cached IP address corresponding to a hostname and transmits a processing request to a system corresponding to the read IP address without transmitting a request for name resolution to the DNS server(s), and
wherein, after the rewriting of all of the DNS server(s) is confirmed to be completed, the setting unit further waits until processing for updating the IP address cached by the distribution server transmitting the request for name resolution to the DNS server(s) to the IP address of the new system is completed, and then starts to rewrite the IP address set for the hostname corresponding to the HTML request to the IP address of the new system.

9. The system according to claim 8, wherein the setting unit waits until the processing for updating the IP address cached by the distribution server transmitting the request for name resolution to the DNS server(s) to the IP address of the new system is completed, further waits for a predetermined time thereafter, and then starts to rewrite the IP address set for the hostname corresponding to the HTML request to the IP address of the new system.

10. The system according to claim 6, wherein, after the rewriting of all of the DNS server(s) is confirmed to be completed, the setting unit starts to rewrite the IP address set for the hostname corresponding to the HTML request to the IP address of the new system in response to confirmation that a log, which is output in response to reception of a processing request for an API request by the system corresponding to the IP address yet to be rewritten, has not been output for a predetermined period of time.

11. A method performed by a system including a client, one or more domain name system (DNS)servers returning an internet protocol (IP) address corresponding to a hostname received with a request for name resolution, a distribution server transmitting a processing request for Hypertext Markup Language (HTML) request and an application programming interface (API) request from the client to a system corresponding to the IP address returned from the DNS server(s), and a management server system, the method comprising:
deploying a program for constructing a system environment in an information processing apparatus to construct a system; and
setting an IP address of the constructed system for each of a hostname corresponding to an HTML request and a hostname corresponding to an API request, the hostnames being registered in the DNS server(s),
wherein, in the setting, after a new system is constructed by the deploying, the current IP address set for the hostname corresponding to the API request is further started to be rewritten to an IP address of the new system, and, in response to confirmation that rewriting of all of the DNS server(s) corresponding to the request for name resolution from the distribution server is completed, the IP address set for the hostname corresponding to the HTML request is started to be rewritten to the IP address of the new system.

12. The method according to claim 11, further comprising transmitting the hostname corresponding to the API request to all of the DNS server(s) with the request for name resolution and determines whether all of the DNS server(s) returns/return the IP address of the new system to confirm completion of the rewriting.

13. The method according to claim 11,
wherein the distribution server has a function of caching the IP address returned from the DNS server(s), and reads a cached IP address corresponding to a hostname and transmits a processing request to a system corresponding to the read IP address without transmitting a request for name resolution to the DNS server(s), and
wherein, after the rewriting of all of the DNS server(s) is confirmed to be completed, the setting further waits until processing for updating the IP address cached by the distribution server transmitting the request for name resolution to the DNS server(s) to the IP address of the new system is completed, and then starts to rewrite the IP address set for the hostname corresponding to the HTML request to the IP address of the new system.

14. The method according to claim 13, wherein the setting further includes:
waiting until the processing for updating the IP address cached by the distribution server transmitting the request for name resolution to the DNS server(s) to the IP address of the new system is completed and waiting for a predetermined time thereafter, and
starting to rewrite the IP address set for the hostname corresponding to the HTML request to the IP address of the new system.

15. The method according to claim 11, wherein, after the rewriting of all of the DNS server(s) is confirmed to be completed, the setting starts to rewrite the IP address set for the hostname corresponding to the HTML request to the IP address of the new system in response to confirmation that a log, which is output in response to reception of a processing request for an API request by the system corresponding to the IP address yet to be rewritten, has not been output for a certain period of time.

16. A non-transitory computer-readable storage medium storing a program for causing a computer to execute a method performed by a management server system for communicating with one or more domain name system (DNS) servers and a distribution server, the DNS server(s) returning an internet protocol (IP) address corresponding to a hostname received with a request for name resolution, the distribution server transmitting a processing request for a Hypertext Markup Language (HTML) request and an application programming interface (API) request from a client to a system corresponding to the IP address returned from the DNS server(s), the method comprising:
deploying a program for constructing a system environment in an information processing apparatus to construct a system; and
setting an IP address of the system constructed by the deploying for each of a hostname corresponding to an HTML request and a hostname corresponding to an API request, the hostnames being registered in the DNS server(s),
wherein, in the setting, after a new system is constructed by the deploying, the current IP address set for the hostname corresponding to the API request is started to be rewritten to an IP address of the new system, and, in response to confirmation that rewriting of all of the DNS server(s) corresponding to the request for name resolution from the distribution server is completed, the IP address set for the hostname corresponding to the HTML request is started to be rewritten to the IP address of the new system.

17. The non-transitory computer-readable storage medium according to claim 16, further comprising transmitting the hostname corresponding to the API request to all of the DNS server(s) with the request for name resolution and determines whether all of the DNS server(s) returns/return the IP address of the new system to confirm completion of the rewriting.

18. The non-transitory computer-readable storage medium according to claim 16,
wherein the distribution server has a function of caching the IP address returned from the DNS server(s), and reads a cached IP address corresponding to a hostname and transmits a processing request to a system corresponding to the read IP address without transmitting a request for name resolution to the DNS server(s), and wherein, after the rewriting of all of the DNS server(s) is confirmed to be completed, the setting unit further waits until processing for updating the IP address cached by the distribution server transmitting the request for name resolution to the DNS server(s) to the IP address of the new system is completed, and then starts to rewrite the IP address set for the hostname corresponding to the HTML request to the IP address of the new system.

19. The non-transitory computer-readable storage medium according to claim 18, wherein the setting further includes:

waiting until the processing for updating the IP address cached by the distribution server transmitting the request for name resolution to the DNS server(s) to the IP address of the new system is completed and waiting for a predetermined time thereafter, and starting to rewrite the IP address set for the hostname corresponding to the HTML request to the IP address of the new system.

20. The non-transitory computer-readable storage medium according to claim 16, wherein, after the rewriting of all of the DNS server(s) is confirmed to be completed, the setting starts to rewrite the IP address set for the hostname corresponding to the HTML request to the IP address of the new system in response to confirmation that a log, which is output in response to reception of a processing request for an API request by the system corresponding to the IP address yet to be rewritten, has not been output for a certain period of time.

* * * * *